United States Patent
Kanenari et al.

(10) Patent No.: US 11,491,831 B2
(45) Date of Patent: Nov. 8, 2022

(54) TIRE INFORMATION ACQUISITION DEVICE HAVING FIRST AND SECOND BANDS FIXING A SENSOR UNIT TO A RIM

(71) Applicant: The Yokohama Rubber Co., LTD., Tokyo (JP)

(72) Inventors: Daisuke Kanenari, Hiratsuka (JP); Yasuhiko Araki, Hiratsuka (JP); Iwao Shimomura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 194 days.

(21) Appl. No.: 16/963,202

(22) PCT Filed: Dec. 20, 2018

(86) PCT No.: PCT/JP2018/047083
§ 371 (c)(1),
(2) Date: Jul. 17, 2020

(87) PCT Pub. No.: WO2019/142595
PCT Pub. Date: Jul. 25, 2019

(65) Prior Publication Data
US 2021/0122198 A1    Apr. 29, 2021

(30) Foreign Application Priority Data
Jan. 18, 2018 (JP) .............................. JP2018-006312

(51) Int. Cl.
*B60C 23/04* (2006.01)
*B60C 19/00* (2006.01)
(Continued)

(52) U.S. Cl.
CPC ........ *B60C 23/04985* (2020.05); *B60C 19/00* (2013.01); *B60C 23/041* (2013.01);
(Continued)

(58) Field of Classification Search
None
See application file for complete search history.

(56) References Cited

U.S. PATENT DOCUMENTS 7,034,672 B2 *   4/2006  Dinello ................. B29C 69/004
                                                         340/447
7,091,840 B2 *   8/2006  Ichinose ............. B60C 23/0462
                                                         340/447
(Continued)

FOREIGN PATENT DOCUMENTS

CN         206485141       9/2017
DE    10 2010 037 597     3/2012
(Continued)

OTHER PUBLICATIONS

International Search Report for International Application No. PCT/JP2018/047083 dated Feb. 12, 2019, 6 pages, Japan.

*Primary Examiner* — Peter J Macchiarolo
*Assistant Examiner* — Jermaine L Jenkins
(74) *Attorney, Agent, or Firm* — Thorpe North & Western

(57) ABSTRACT

Provided is a tire information acquisition device that includes a sensor unit including a sensor that acquires tire information, a first band that is for fixing the sensor unit (1) to a rim (R) and has an adjustable band circumferential length by fastening another end reversibly with a fastening portion provided to one end, and at least one second band that fastens the sensor unit and the first band integrally.

17 Claims, 6 Drawing Sheets

(51) Int. Cl.
   *G01L 17/00* (2006.01)
   *G01L 19/00* (2006.01)
(52) U.S. Cl.
   CPC .......... *G01L 17/00* (2013.01); *G01L 19/0092* (2013.01); *B60C 2019/004* (2013.01)

(56) References Cited

U.S. PATENT DOCUMENTS

| | | | |
|---|---|---|---|
| 8,776,589 | B1 | 7/2014 | Brown |
| 9,821,614 | B1* | 11/2017 | Brown .................. B60C 23/20 |
| 2002/0148286 | A1* | 10/2002 | Losey ................ B60C 23/0408 |
| | | | 73/146 |
| 2004/0118195 | A1* | 6/2004 | Nespo ................ B60C 23/0408 |
| | | | 73/146 |
| 2004/0155764 | A1 | 8/2004 | Ichinose |
| 2006/0248947 | A1* | 11/2006 | Phalak .............. B60C 23/04985 |
| | | | 73/146 |
| 2008/0018445 | A1 | 1/2008 | Shimura |
| 2011/0043343 | A1* | 2/2011 | Shepler ................ B60C 23/007 |
| | | | 73/146.2 |
| 2011/0296907 | A1* | 12/2011 | Luce ................ B60C 23/04985 |
| | | | 73/146.8 |
| 2016/0129738 | A1 | 5/2016 | Luce |
| 2016/0229238 | A1 | 8/2016 | Schwammlein et al. |
| 2018/0029428 | A1* | 2/2018 | Markert ............ B60C 23/04985 |

FOREIGN PATENT DOCUMENTS

| | | |
|---|---|---|
| JP | H10-315720 | 12/1998 |
| JP | 2004-237951 | 8/2004 |
| JP | 2007-055347 | 3/2007 |
| JP | 2016-104619 | 6/2016 |
| JP | 2016-538195 | 12/2016 |
| WO | WO 2006/068113 | 6/2006 |
| WO | WO 2015/055479 | 4/2015 |

\* cited by examiner

TIRE INFORMATION ACQUISITION DEVICE HAVING FIRST AND SECOND BANDS FIXING A SENSOR UNIT TO A RIM

TECHNICAL FIELD

The present technology relates to a tire information acquisition device, more specifically to a tire information acquisition device that can be achieved at a low cost and installed easily and is applicable to various rim sizes.

BACKGROUND ART

In order to acquire tire internal information such as an internal pressure and a temperature, installation of various types of sensors in a tire cavity is performed. As such method of installing a sensor in a pneumatic tire, a method of fixing a sensor to a rim through use of a band is proposed (for example, see Japan Unexamined Patent Publication Nos. 2016-104619 and 2016-538195). However, the band described in Japan Unexamined Patent Publication Nos. 2016-104619 and 2016-538195 described above is formed to have a specific length, and does not have a band structure applicable to both a tire for a passenger vehicle and a large tire for a truck and the like. Thus, there arises a problem in that the band is not widely applicable to various rim sizes.

Further, as a method of installing a sensor in a pneumatic tire, a method of fixing a sensor to an end of a valve of a wheel is proposed. When fixation is performed in this manner, there are advantageous points in that an installation position of the sensor can be recognized from the outside of the tire and that rim mounting is relatively easy. However, in a case of a tire for a truck, various types of valves are present, and dedicated valves that are applicable thereto are required. Thus, the method is not desirable in view of product management and cost.

SUMMARY

The present technology provides a tire information acquisition device that can be achieved at a low cost and installed easily and is applicable to various rim sizes.

A tire information acquisition device includes a sensor unit including a sensor configured to acquire tire information, a first band that is for fixing the sensor unit to a rim and has an adjustable band circumferential length by fastening another end reversibly with a fastening portion provided to one end, and at least one second band configured to fasten the sensor unit and the first band integrally.

In the present technology, included are a sensor unit including a sensor configured to acquire tire information, a first band that is for fixing the sensor unit to a rim and has an adjustable band circumferential length by fastening another end reversibly with a fastening portion provided to one end, and at least one second band configured to fasten the sensor unit and the first band integrally. With this simple mechanism, manufacturing can be performed at a low cost, and the sensor unit can be easily installed to the rim. Further, the first band having a single size is applicable to various rim sizes.

According to the present technology, the first band preferably has a width falling within a range from 5 mm to 50 mm. By setting the width of the first band as appropriate as described above, a defect can be prevented at the time of rim mounting or attaching of the first band.

In the present technology, before a state of mounting to the rim, a band length of the first band preferably falls within a range from 1800 mm to 2500 mm, and the first band preferably has a structure in which the other end is cuttable. In this way, the present technology is widely applicable to various rim sizes such as a tire for a passenger vehicle and a large tire for a truck and the like. Particularly, in a case where a predetermined length is left in the region from the fastening portion to the other end at the time of cutting the first band, the same first band can be reused after replacement of the sensor unit.

In the present technology, the first band preferably has breathability. In this way, even when the first band is arranged to cover a ventilation hole in the sensor unit, breathability of the ventilation hole formed in the surface of the sensor unit can be secured.

In the present technology, the sensor unit is preferably arranged between the first band and the rim. By arranging the sensor unit inward of the first band in a tire radial direction, the sensor unit can be firmly fixed to the rim. In the present technology, a groove or a hole that allows the second band to pass therethrough is preferably formed in a housing forming the sensor unit, and the groove or the hole preferably accommodates a part of or an entirety of a fastening portion of the second band. In this way, fastening performance of the second band can be improved, and deviation of the second band in a tire circumferential direction can be prevented. Further, at the time of rim mounting, breakage of the fastening portion of the second band, which is caused by contact of bead portions of the pneumatic tire, and degradation of performance of rim mounting can be prevented.

In the present technology, at least parts of a band body and the fastening portion of the first band, which are held in contact with the rim, are preferably formed of a non-metal material. When the part of the first band, which is held in contact with the rim, is formed of a metal material, rust may be generated due to a difference in ionization tendency in some cases. In contrast, when the part of the first band, which is held in contact with the rim, is formed of a non-metal material, rust can be prevented from being generated.

In the present technology, a base configured to retain the sensor unit is preferably inserted between the second band and the rim, and the base preferably has thermal conductivity of 1.0 W/m·K or less. When the sensor unit is directly held in contact with the rim, heat from the rim is likely to affect temperature information of tire information. Further, the second band is wound about a lower part of the sensor unit, and hence the second band may be rubbed by the rim, worn out, and broken during long-term travel. With the configuration described above, effect of heat from the rim can be suppressed, and breakage or wear of the second band can be prevented.

In the present technology, at least a part of the base, which is held in contact with the rim, preferably has a slippage prevention portion. In some cases, at the time of rim mounting, bead portions of the pneumatic tire may be held in contact with the sensor unit and the band members, and the sensor unit may be deviated in a tire lateral direction. By providing the slippage prevention portion to the base, such deviation can be prevented from being caused.

BRIEF DESCRIPTION OF DRAWINGS

FIG. 5A is a plan view, and FIG. 5B is a side view in the direction of the arrow Y of FIG. 5A.

DETAILED DESCRIPTION

Figure 1:
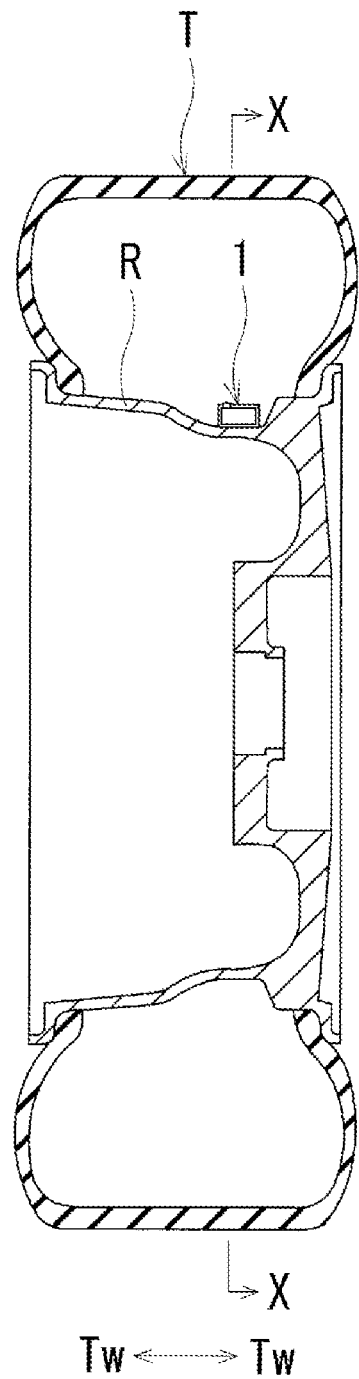
FIG. 1 is a cross-sectional view illustrating a pneumatic tire to which a tire information acquisition device according to an embodiment of the present technology is mounted.
Figure 2:
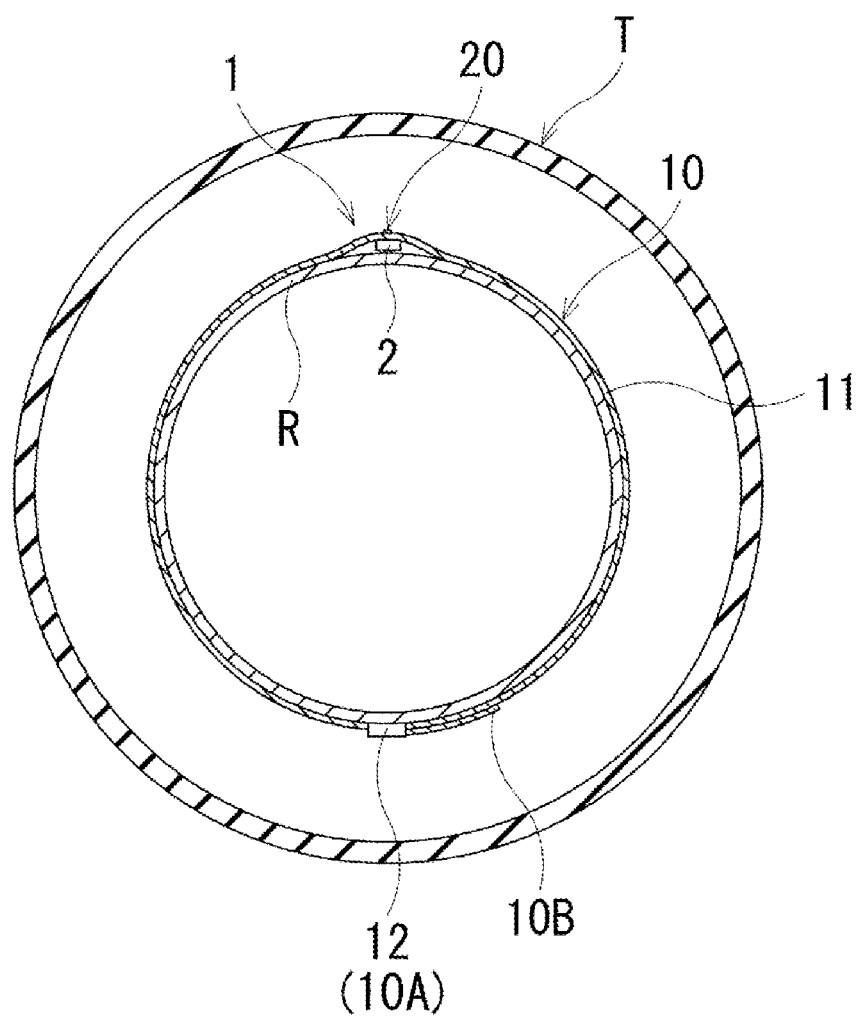
FIG. 2 is a cross-sectional view taken along the arrow X-X of FIG. 1.
Figure 3:
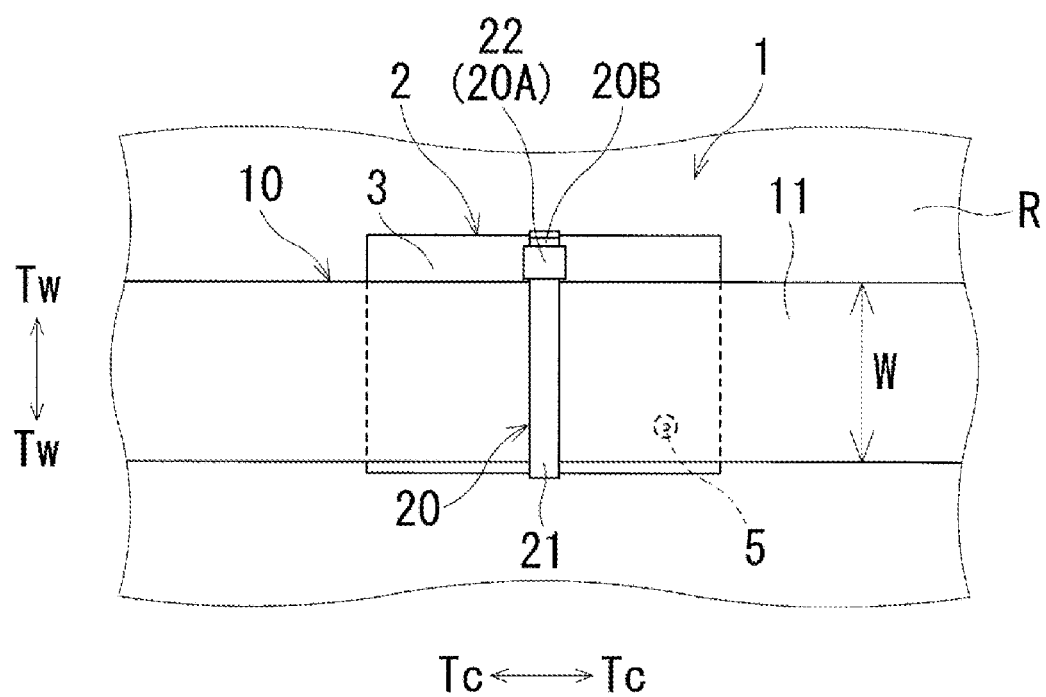
FIG. 3 is a plan view of the tire information acquisition device according to the embodiment of the present technology.
Figure 4:
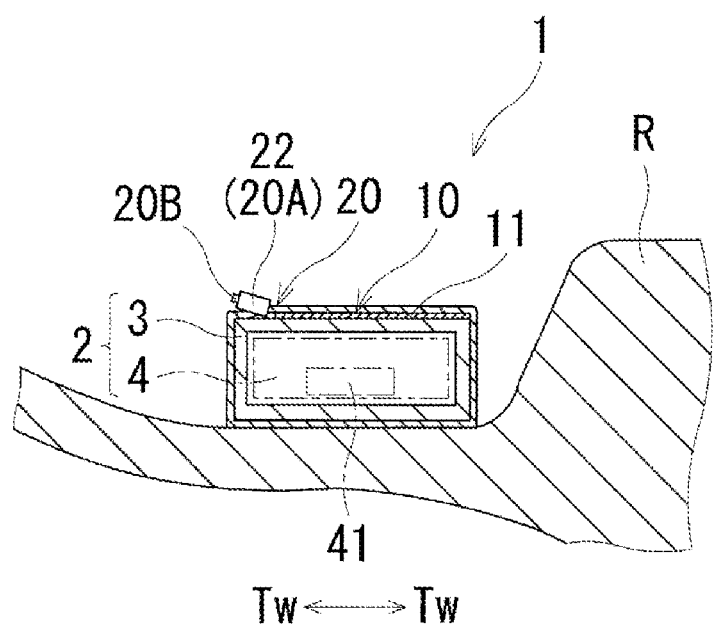
FIG. 4 is a cross-sectional view illustrating the tire information acquisition device according to the embodiment of the present technology.

Configurations of embodiments of the present technology will be described in detail below with reference to the accompanying drawings. FIGS. 1 and 2 illustrate a pneumatic tire to which a tire information acquisition device according to an embodiment of the present technology is mounted. FIGS. 3 and 4 illustrate the tire information acquisition device according to the embodiment of the present technology. Note that, in FIGS. 1, 3, and 4, the arrow Tw indicates the tire lateral direction, and the arrow Tc indicates the tire circumferential direction.

As illustrated in FIGS. 1 and 2, a tire cavity is formed between a pneumatic tire T and a rim R. In the tire cavity, a tire information acquisition device 1 is mounted to the rim R. The tire information acquisition device 1 is arranged in a well that is a flat portion of the rim R.

As illustrated in FIGS. 3 and 4, the tire information acquisition device 1 includes a sensor unit 2 that measures a state of the pneumatic tire T, a first band 10 that fixes the sensor unit 2 to the rim R, and a second band 20 that fastens the sensor unit 2 and the first band 10 integrally.

The sensor unit 2 includes a housing 3 and electronic components 4. The housing 3 has a hollow structure, and accommodates the electronic components 4 therein. A ventilation hole 5 that allows air in the tire cavity to pass therethrough is provided in the housing 3. The electronic components 4 include sensors 41 including a temperature sensor and a pressure sensor, a transmitter, a receiver, a control circuit, a battery, and the like as appropriate. Further, the sensor unit 2 transmits an internal temperature and an internal pressure of the pneumatic tire T, which are measured by the sensors 41, to the outside of the tire. The sensor unit 2 may be arranged outward of the first band 10 in a tire radial direction. However, in order to firmly fix the sensor unit 2 to the rim R, the sensor unit 2 is arranged inward of the first band 10 in the tire radial direction (between the first band 10 and the rim R).

The first band 10 is formed of a band body 11 and a fastening portion 12. The fastening portion 12 is provided to one end 10a of the first band 10, and reversibly fastens the other end 10B. With this fastening structure, the first band 10 has an adjustable band circumferential length.

The second band 20 is at least one band formed of a band body 21 and a fastening portion 22. The fastening portion 22 is provided to one end 20A, and fastens the other end 20B. The fastening portion 22 may reversibly fasten the other end 20B, or alternatively, non-reversibly fasten the other end 20B. A zip tie is exemplified as the second band 20, and in this case, the fastening portion 22 non-reversibly fastens the other end 20B. An excessive part from the fastening portion 22 to the other end 20B may be cut as appropriate.

In a case where the sensor unit 2 is fixed to the rim R through use of the first band 10 and the second band 20 described above, the first band 10 is stretched along an extension direction of the sensor unit 2 at an intermediate position between the one end 10A and the other end 10B of the first band 10, the second band 20 is arranged in a direction intersecting or orthogonal to an extension direction of the first band 10, and the second band 20 is wound about both the sensor unit 2 and the first band 10. Further, the other end 20B is inserted into the fastening portion 22 of the second band 20, and is fastened. Subsequently, the first band 10 and the sensor unit 2 that are integrated by the second band 20 are placed in the well of the rim R, and the other end 10B is inserted into the fastening portion 12 of the first band 10, and is fastened. At this stage, a region from the other end 10B to the fastening portion 12 may be cut by leaving a predetermined length, or alternatively, may be fixed through use of a separate member such as a clip. In this manner, the tire information acquisition device 1 can be fixed to the rim R. Note that, in the description given above, the second band 20 is fastened prior to the first band 10. After the first band 10 fixes the sensor unit 2 to the rim R, the second band 20 may be wound about both the sensor unit 2 and the first band 10 so as to fasten the second band 20.

In the tire information acquisition device 1 described above, provided are the sensor unit 2 that measures a state of the pneumatic tire T, the first band 10 that is for fixing the sensor unit 2 to the rim R and has an adjustable band circumferential length by fastening the other end 10B reversibly with the fastening portion 12 provided to the one end 10A, and at least one second band 20 that fastens the sensor unit 2 and the first band 10 integrally. With this simple mechanism, manufacturing can be performed at a low cost, and the sensor unit 2 can be easily installed to the rim R. Further, the first band 10 having a single size is applicable to various rim sizes.

In the tire information acquisition device described above, a width W of the first band 10 preferably falls within a range of from 5 mm to 50 mm. By setting the width W of the first band 10 as appropriate as described above, a defect can be prevented at the time of rim mounting or attaching of the first band 10. Here, when the width W of the first band 10 is smaller than 5 mm, the sensor unit 2 is more likely to be deviated at the time of mounting the pneumatic tire T to a rim. In contrast, when the width W of the first band 10 is larger than 50 mm, the first band 10 may not be settled in the well of the rim R.

Further, the band length under a state in which the first band 10 is not attached to the rim R falls within a range from 1800 mm to 2500 mm, and a structure in which the other end 10B of the first band 10 can be cut is preferably adopted. This cuttable structure indicates a structure that enables a cutting tool such as scissors to perform cutting. Further, under a state in which the tire information acquisition device 1 is mounted to the rim R, when an excessive part exists by removing a predetermined length from the region of the first band 10 from the fastening portion 12 to the other end 10B, the excessive part is cut. For example, when the band length is 2000 mm, a predetermined length from 100 mm to 150 mm is left in the region from the fastening portion 12 to the other end 10B, and the other part is cut as an excessive part. Particularly, in a case where fabric is used as the band body 11 of the first band 10, and the fastening portion 12 having a structure engageable with the fabric is provided to the one end 10A of the first band 10, the first band 10 can be cut to have a freely-selective band length, and length adjustment can be performed steplessly, which is suitable. By setting the band length of the first band 10 as appropriate as described above, the present technology is widely applicable to various rim sizes such as a tire for a passenger vehicle and a large tire for a truck and the like. Particularly, in a case where a predetermined length is left in the region from the fastening portion 12 to the other end 10B at the time of cutting the first band 10, the same first band 10 can be reused after replacement of the sensor unit 2.

Further, the first band 10 preferably has breathability. Even when the first band 10 is arranged to cover the ventilation hole 5 in the sensor unit 2, breathability of the ventilation hole 5 formed in the surface of the sensor unit 2 can be secured with the first band 10 having breathability as described above.

In the tire information acquisition device described above, at least parts of the band body 11 and the fastening portion 12 forming the first band 10, which are held in contact with the rim R, are preferably formed of a non-metal material. As a method of forming the part of the first band 10, which is held in contact with the rim R, with a non-metal material, applying a coating material formed of a non-metal material or attaching a non-metal material on the surface of the band body 11, and alternately inserting a separate member formed of a non-metal material between the band body 11 and the rim R are exemplified. Examples of a non-metal material include plastic, rubber, ceramics, and natural fibers, and plastic is particularly suitable. When the part of the first band 10, which is held in contact with the rim R, is formed of a metal material, rust may be generated due to a difference in ionization tendency in some cases. In contrast, when the part of the first band 10, which is held in contact with the rim R, is formed of a non-metal material, rust can be prevented from being generated.

Figure 5A:
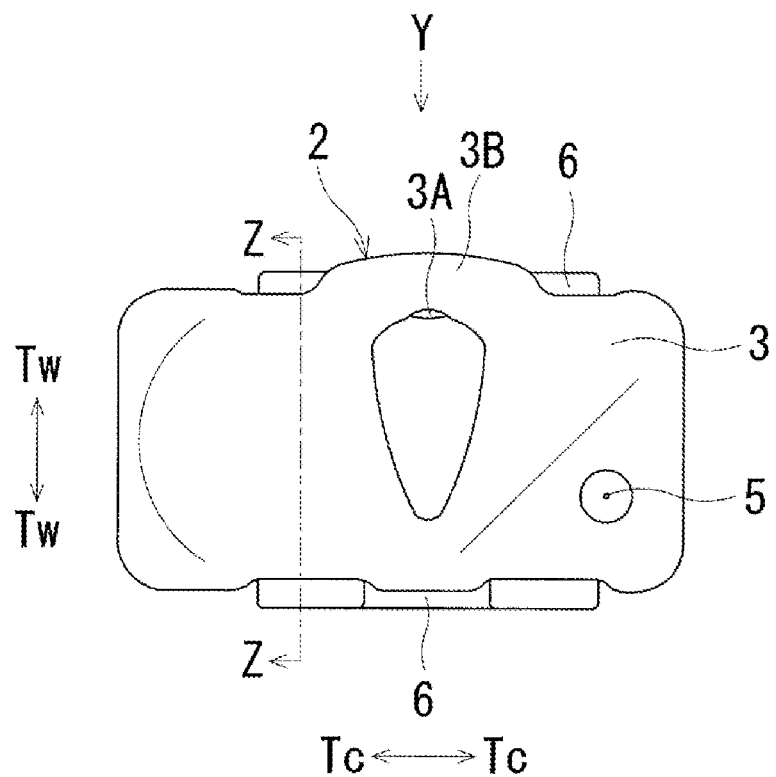
FIGS. 5A and 5B illustrate a modified example of a sensor unit of the tire information acquisition device according to the embodiment of the present technology.
Figure 5B:
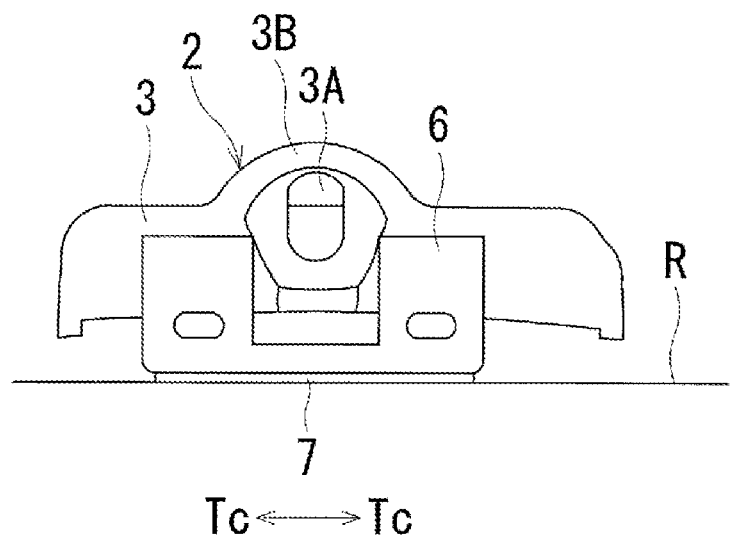
Figure 6:
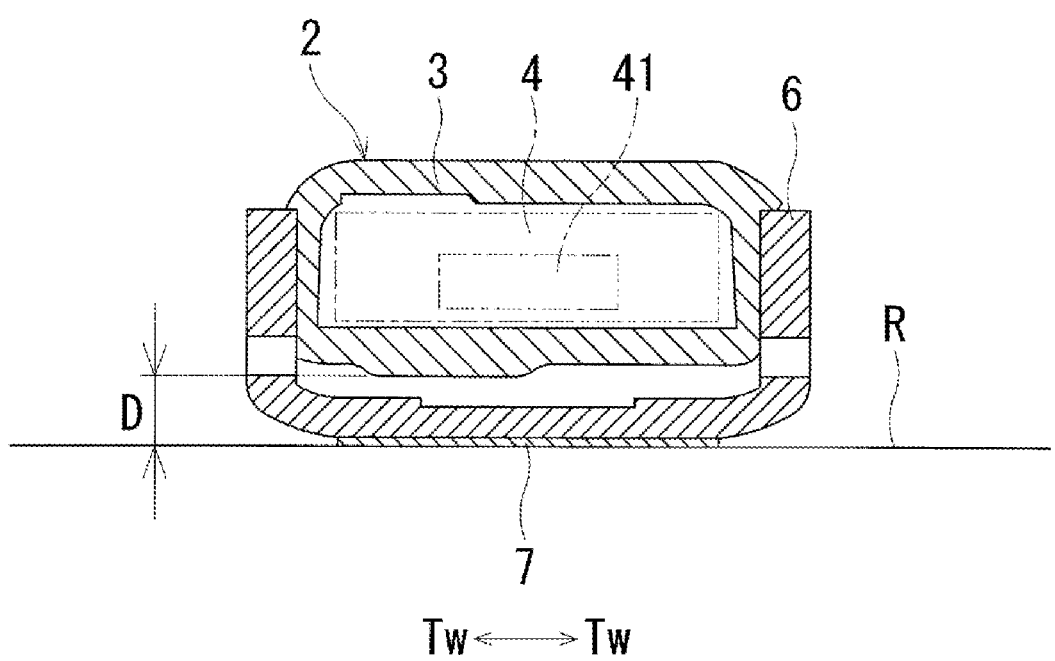
FIG. 6 is a cross-sectional view taken along the arrow Z-Z of FIG. 5A.

Further, each of the sensor unit 2, the band body 11, and the fastening portion 12 is preferably formed of a formable material having relatively high heat resistance. Examples of a material having such physical properties include polypropylene, polyethylene, and nylon. Further, the band body 21 and the fastening portion 22 forming the second band 20 are preferably formed similarly to the sensor unit 2, the band body 11, and the fastening portion 12. FIGS. 5A, 5B, and 6 illustrate a modified example of the sensor unit of the tire information acquisition device according to the embodiment of the present technology. As illustrated in FIGS. 5A and 5B, a recess 3A is provided in the housing 3 forming the sensor unit 2. In the embodiment of FIGS. 5A and 5B, a case where a hole through which a protrusion 3B passes in a tire direction is formed as the recess 3A is exemplified, but the present technology is not particularly limited thereto. In addition, a groove extending in a tire lateral direction may be formed. A part of or an entirety of the fastening portion 22 of the second band 20 may be accommodated in the recess 3A thus formed. A depth of the recess 3A is preferably set to such depth that the entire fastening portion 22 of the second band 20 can be accommodated. Particularly, in a case of the embodiment illustrated in FIGS. 5A and 5B, the recess 3A formed in the protrusion 3B can accommodate the entire fastening portion 22 of the second band 20, and hence the recess 3A can protect the fastening portion 22.

As described above, the recess 3A that allows the second band 20 to be inserted therethrough is provided, and the fastening portion 22 of the second band 20 is accommodated in the recess 3A. With this, fastening performance of the second band 20 can be improved, and deviation of the second band 20 in the tire circumferential direction can be prevented. Further, at the time of rim mounting, breakage of the fastening portion 22 of the second band 20, which is caused by contact of bead portions of the pneumatic tire T, and degradation of performance of rim mounting can be prevented.

As illustrated in FIG. 6, a base 6 that retains the sensor unit 2 is provided. In the embodiment of FIG. 6, a case where the base 6 is formed to have a U shape in a cross-sectional view in the tire lateral direction is exemplified, but the shape of the base 6 is not limited. The base 6 is used by being inserted between the second band 20 and the rim R at the time of mounting the tire information acquisition device 1. Thermal conductivity of the base 6 is preferably 1.0 W/m·K or less, more preferably, 0.5 W/m·K or less. Examples of a material having such physical properties include natural rubber, polyamide, and polypropylene. When the sensor unit 2 is directly held in contact with the rim R, heat from the rim R is likely to affect temperature information of tire information. Further, the second band 20 is wound about a lower part of the sensor unit 2, and hence the second band 20 may be rubbed by the rim R, worn out, and broken during long-term travel. As described above, the base 6 is arranged between the second band 20 and the rim R, and thermal conductivity of the base 6 is set as appropriate. With this, effect of heat from the rim R can be suppressed, and breakage or wear of the second band 20 can be prevented.

Further, a slippage prevention portion 7 is provided to at least a part of the base 6, which is held in contact with the rim R. For example, the slippage prevention portion 7 may be formed by attaching a material having a high friction coefficient on the base 6 or forming the base 6 with a material having a high friction coefficient. Alternatively, the slippage prevention portion 7 may be formed by subjecting the surface of the base 6 to grinding and increasing a friction coefficient of the surface of the base 6. Examples of a material having a high friction coefficient forming the base 6 include rubber and low density polyethylene, and rubber is particularly suitable. By providing the slippage prevention portion 7 to the base 6 as described above, at the time of rim mounting, bead portions of the pneumatic tire T can be prevented from being held in contact with the sensor unit 2 and the band member (the first band 10 or the second band 20), and the sensor unit 2 can be prevented from being deviated in the tire lateral direction.

In the tire information acquisition device described above, a distance D between the rim R and the sensor unit 2 (see FIG. 6) is preferably 1 mm or more, more preferably, falls within a range from 3 mm to 5 mm. By appropriately setting the distance D as described above, thermal effect on the pneumatic tire T can be minimized. Here, when the distance D is larger than 5 mm, bead portions are more likely to be held in contact with the sensor unit 2 at the time of rim mounting. Thus, performance of rim mounting may be degraded.

The invention claimed is:
1. A tire information acquisition device, comprising:
   a sensor unit including a sensor configured to acquire tire information;
   a first band for fixing the sensor unit to a rim, the first band having an adjustable band circumferential length by fastening another end reversibly with a fastening portion provided to one end; and
   at least one second band configured to fasten the sensor unit and the first band integrally.

2. The tire information acquisition device according to claim 1, wherein the first band has a width falling within a range from 5 mm to 50 mm.

3. The tire information acquisition device according to claim 2, wherein, before a state of mounting to the rim, a band length of the first band falls within a range from 1800 mm to 2500 mm, and the first band has a structure in which the other end is cuttable.

4. The tire information acquisition device according to claim 3, wherein the first band has breathability.

5. The tire information acquisition device according to claim 4, wherein the sensor unit is arranged between the first band and the rim.

6. The tire information acquisition device according to claim 5, wherein a groove or a hole that allows the second band to pass therethrough is formed in a housing forming the sensor unit, and the groove or the hole accommodates a part of or an entirety of a fastening portion of the second band.

7. The tire information acquisition device according to claim 6, wherein at least parts of a band body and the fastening portion of the first band, which are held in contact with the rim, are formed of a non-metal material.

8. The tire information acquisition device according to claim 7, wherein a base configured to retain the sensor unit is inserted between the second band and the rim, and the base has thermal conductivity of 1.0 W/mK or less.

9. The tire information acquisition device according to claim 8, wherein at least a part of the base, which is held in contact with the rim, has a slippage prevention portion.

10. The tire information acquisition device according to claim 1, wherein, before a state of mounting to the rim, a band length of the first band falls within a range from 1800 mm to 2500 mm, and the first band has a structure in which the other end is cuttable.

11. The tire information acquisition device according to claim 1, wherein the first band has breathability.

12. The tire information acquisition device according to claim 1, wherein the sensor unit is arranged between the first band and the rim.

13. The tire information acquisition device according to claim 1, wherein a groove or a hole that allows the second band to pass therethrough is formed in a housing forming the sensor unit, and the groove or the hole accommodates a part of or an entirety of a fastening portion of the second band.

14. The tire information acquisition device according to claim 1, wherein at least parts of a band body and the fastening portion of the first band, which are held in contact with the rim, are formed of a non-metal material.

15. The tire information acquisition device according to claim 1, wherein a base configured to retain the sensor unit is inserted between the second band and the rim, and the base has thermal conductivity of 1.0 W/mK or less.

16. The tire information acquisition device according to claim 15, wherein at least a part of the base, which is held in contact with the rim, has a slippage prevention portion.

17. The tire information acquisition device according to claim 1, wherein the sensor unit, including the sensor, is arranged inward of the first band in a tire radial direction.

* * * * *